(12) United States Patent
Hu et al.

(10) Patent No.: US 11,465,048 B2
(45) Date of Patent: Oct. 11, 2022

(54) METHOD AND DEVICE FOR EXECUTING ATTACK OPERATION, STORAGE MEDIUM AND ELECTRONIC DEVICE

(71) Applicant: Tencent Technology (Shenzhen) Company Limited, Shenzhen (CN)

(72) Inventors: Fan Hu, Shenzhen (CN); Jie Ou, Shenzhen (CN); Jiacheng Wei, Shenzhen (CN); Ruihan Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 16 days.

(21) Appl. No.: 16/879,652

(22) Filed: May 20, 2020

(65) Prior Publication Data

US 2020/0282312 A1 Sep. 10, 2020

Related U.S. Application Data

(63) Continuation of application No. PCT/CN2019/072342, filed on Jan. 18, 2019.

(30) Foreign Application Priority Data

Jan. 22, 2018 (CN) .......................... 201810060975.1

(51) Int. Cl.
*A63F 13/58* (2014.01)
*A63F 13/352* (2014.01)
(Continued)

(52) U.S. Cl.
CPC ............ *A63F 13/58* (2014.09); *A63F 13/352* (2014.09); *A63F 13/44* (2014.09); *A63F 13/56* (2014.09); *A63F 13/847* (2014.09)

(58) Field of Classification Search
CPC ........ A63F 13/58; A63F 13/352; A63F 13/44; A63F 13/56; A63F 13/847
See application file for complete search history.

(56) References Cited

U.S. PATENT DOCUMENTS

2014/0357380 A1* 12/2014 Wang ...................... A63F 13/00
463/43
2015/0031421 A1* 1/2015 Jo ........................... A63F 13/30
463/2
(Continued)

FOREIGN PATENT DOCUMENTS

CN 105117579 A 12/2015
CN 105457275 A 4/2016
(Continued)

OTHER PUBLICATIONS

EVE online archive forums Nov. 2011 [retrieved Aug. 12, 2021] (Year: 2011).*
(Continued)

*Primary Examiner* — Thomas H Henry
(74) *Attorney, Agent, or Firm* — Morgan, Lewis & Bockius LLP

(57) ABSTRACT

This application discloses a method of performing an attack operation in a game by a computing device. The computing device determines a target range corresponding to a first attack operation performed by a first controlled object; determines a target attack object from to-be-attacked objects according to attribute values of the to-be-attacked objects in a case that there are the to-be-attacked objects in the target range, the to-be-attacked objects belonging to a second group, and the attribute value of the to-be-attacked object including: a reduced health value of the to-be-attacked object after the first attack operation is performed on the to-be-attacked object, and/or, a reduced health value of an object in the first group after a second attack operation of the
(Continued)

to-be-attacked object is performed on the object; and then controls the first controlled object to perform the first attack operation on the target attack object in the virtual scene.

18 Claims, 6 Drawing Sheets

(51) Int. Cl.
*A63F 13/44* (2014.01)
*A63F 13/56* (2014.01)
*A63F 13/847* (2014.01)

(56) References Cited

U.S. PATENT DOCUMENTS

| | | | |
|---|---|---|---|
| 2015/0157940 A1* | 6/2015 | Hall | A63F 13/533 463/31 |
| 2016/0287990 A1 | 10/2016 | Garvin et al. | |

FOREIGN PATENT DOCUMENTS

| | | |
|---|---|---|
| CN | 105582674 A | 5/2016 |
| CN | 106178508 A | 12/2016 |
| CN | 107080941 A | 8/2017 |
| CN | 107291317 A | 10/2017 |
| CN | 107441707 A | 12/2017 |
| CN | 108310772 A | 7/2018 |

OTHER PUBLICATIONS

Tencent Technology, ISR, PCT/CN2019/079342, dated Apr. 17, 2019, 2 pgs.
Tencent Technology, WO, PCT/CN2019/072342, dated Apr. 17, 2019, 5 pgs.
Tencent Technology, IPRP, PCT/CN2019/072342, dated Jul. 28, 2020, 6 pgs.

* cited by examiner

METHOD AND DEVICE FOR EXECUTING ATTACK OPERATION, STORAGE MEDIUM AND ELECTRONIC DEVICE

CROSS-REFERENCE TO RELATED APPLICATION

This application is a continuation application of PCT Application No. PCT/CN2019/072342, entitled "METHOD AND APPARATUS FOR EXECUTING ATTACK OPERATION, STORAGE MEDIUM, AND ELECTRONIC APPARATUS" filed on Jan. 18, 2019, which claims priority to Chinese Patent Application No. 201810060975.1, entitled "ATTACK OPERATION PERFORMING METHOD AND APPARATUS, STORAGE MEDIUM, AND ELECTRONIC APPARATUS" filed with the Chinese National Intellectual Property Administration on Jan. 22, 2018, all of which are incorporated by reference in their entirety.

FIELD OF THE TECHNOLOGY

Embodiments of this application relate to the field of computers, and in particular, to an attack operation performing method and apparatus, a storage medium, and an electronic apparatus.

BACKGROUND OF THE DISCLOSURE

Currently, in a case that a player performs an attack in a multiplayer online battle arena (MOBA) game, the nearest unit or the lowest health point unit may be attacked according to a preset mode. However, the optimal attack target cannot be obtained by determining an attack target merely based on distance or health points. For example, it is easier to kill an archer with 600 health points than a tank with 500 health points. In this case, an attack target determined according to a determination condition of "attacking the lowest health point unit first" is not the optimal choice. For another example, it is assumed that an attack range of a hero is 800 yards, an enemy archer is 600 yards away from the hero, and an enemy warrior is 500 yards away from the hero. It is obvious that the archer can attack the hero while the warrior cannot. In this case, it is not reasonable to attack an object closer to the hero, and an attack target determined according to a determination condition of "attacking the nearest unit first" is not the optimal choice either.

Consequently, there is a problem of relatively low accuracy of determining an attack target in a game in the related art, which severely affects the gaming experience of a user.

In view of the foregoing problem, no effective solution has been provided yet at present.

SUMMARY

Embodiments of this application provide an attack operation performing method and apparatus, a storage medium, and an electronic apparatus, to resolve a technical problem of relatively low accuracy of determining an attack object in a game in the related art.

According to an aspect of the embodiments of this application, a method of performing an attack operation in a game is performed by a computing device and includes: determining, in a virtual scene of a client of the game running on the computing device, a target range corresponding to a first attack operation performed by a first controlled object in the virtual scene, the target range comprising an attack range of the first attack operation, and the first controlled object belonging to a first group in the virtual scene; identifying to-be-attacked objects in the target range, the to-be-attacked objects belonging to a second group in the virtual scene; determining a target attack object from the to-be-attacked objects according to attribute values of the to-be-attacked objects, and the attribute value of the to-be-attacked object comprising: a reduced health value of the to-be-attacked object after the first attack operation is performed on the to-be-attacked object, and/or, a reduced health value of an object in the first group after a second attack operation by the to-be-attacked object is performed on the object in the first group; and controlling the first controlled object to perform the first attack operation on the target attack object in the virtual scene.

According to another aspect of the embodiments of this application, an attack operation performing apparatus is further provided. The apparatus includes one or more processors and one or more memories storing program units, where the program units are executed by the processors to perform the aforementioned method of performing an attack operation in a game.

According to another aspect of the embodiments of this application, a non-transitory storage medium is further provided, the storage medium storing a plurality of computer programs, the computer programs being configured to perform any attack operation performing method according to the embodiments of this application when being run.

According to another aspect of the embodiments of this application, an electronic apparatus is further provided, the electronic apparatus including a memory and a processor, the memory storing a computer program, and the processor being configured to perform any one of the attack operation performing methods according to the embodiments of this application through the computer program.

In the embodiments of this application, in a virtual scene of a client, a target range corresponding to a first attack operation performed by a first controlled object in the virtual scene is determined, the target range including an attack range of the first attack operation, the first controlled object belonging to a first group in the virtual scene; a target attack object is determined from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object; and the first controlled object is controlled to perform the first attack operation on the target attack object in the virtual scene. Therefore, an objective of accurately determining an attack object in a game is achieved, thereby resolving the technical problem of relatively low accuracy of determining an attack object in a game in the related art, achieving the technical effect of improving the accuracy of determining an attack object in a game, and improving the gaming experience of a user.

BRIEF DESCRIPTION OF THE DRAWINGS

Accompanying drawings described herein are used for providing further understanding about the embodiments of this application, and constitute one portion of the embodiments of this application; and exemplary embodiments of this application and description thereof are used for explaining this application, and do not constitute an inappropriate limit on this application. In the accompanying drawings.

DESCRIPTION OF EMBODIMENTS

To make a person skilled in the art better understand solutions of the embodiments of this application, the following clearly and completely describes the technical solutions in the embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects rather than indicating a specific order. It is understood that the data termed in such a way are interchangeable in proper circumstances, so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

According to one aspect of the embodiments of this application, an attack operation performing method is provided.

Figure 1:
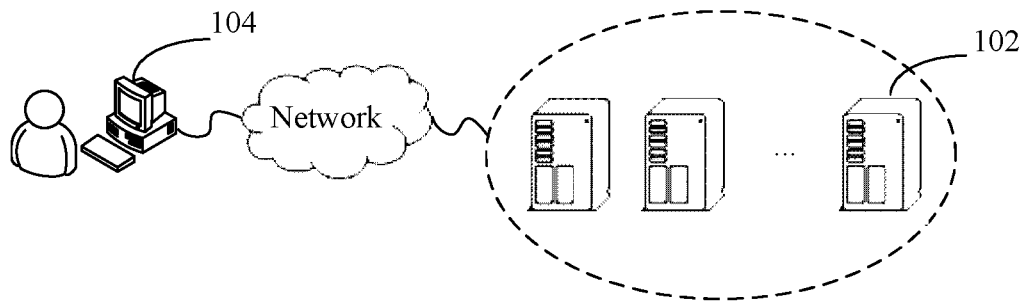
FIG. 1 is a schematic diagram of a hardware environment of an attack operation performing method according to an embodiment of this application.

Optionally, in this embodiment, the attack operation performing method may be applied to a hardware environment including a server 102 and a terminal 104 in FIG. 1. As shown in FIG. 1, the server 102 is connected to the terminal 104 by a network. The network includes, but is not limited to, a wide area network, a metropolitan area network or a local area network. The terminal 104 may include, but is not limited to, a personal computer (PC), a mobile phone, and a tablet computer. The attack operation performing method in the embodiments of this application may be performed by an electronic apparatus, for example, be performed by the terminal 104 or may be performed by a client installed on the terminal 104.

Figure 2:
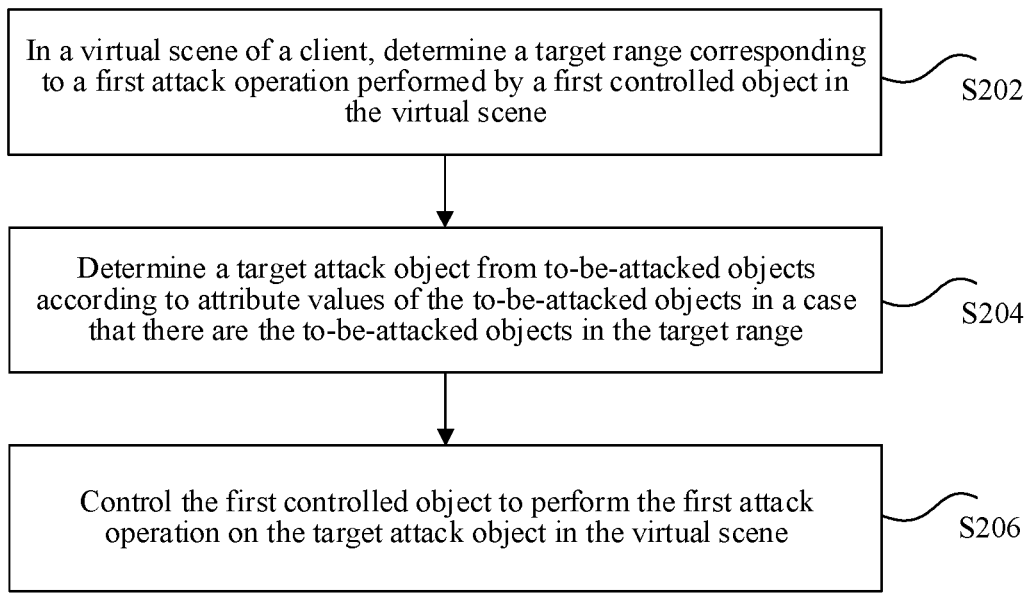
FIG. 2 is a flowchart of an optional attack operation performing method according to an embodiment of this application.

FIG. 2 is a flowchart of an optional attack operation performing method according to an embodiment of this application. The following uses an example in which the attack operation performing method in the embodiments of this application is performed by the electronic apparatus for description. As shown in FIG. 2, the method may include the following steps:

Step S202. In a virtual scene of a client, the electronic apparatus determines a target range corresponding to a first attack operation performed by a first controlled object in the virtual scene, the target range including an attack range of the first attack operation, the first controlled object belonging to a first group in the virtual scene, and the client being installed on the electronic apparatus.

Step S204. The electronic apparatus determines a target attack object from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object.

Step S206. The electronic apparatus controls the first controlled object to perform the first attack operation on the target attack object in the virtual scene.

By means of step S202 to step S206, in a virtual scene of a client, a target range corresponding to a first attack operation performed by a first controlled object in the virtual scene is determined, the target range including an attack range of the first attack operation, the first controlled object belonging to a first group in the virtual scene; a target attack object is determined from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object; and the first controlled object is controlled to perform the first attack operation on the target attack object in the virtual scene. Therefore, an objective of accurately determining an attack object in a game is achieved, thereby resolving the technical problem of relatively low accuracy of determining an attack object in a game in the related art, achieving the technical effect of improving the accuracy of determining an attack object in a game, and improving the gaming experience of a user.

In the technical solution provided in step S202, the client in the embodiments of this application may be a game client, and the game client in the embodiments of this application may be a MOBA, for example, Honor of Kings. The virtual scene of the client in the embodiments of this application may be a virtual game scene of the client. In the virtual game scene of the client, two groups may be included. Each group may include at least one controlled object. The controlled object may be an object controlled by a player in the virtual game scene, for example, a hero in Honor of Kings. The player may control the controlled object in the virtual game scene to perform game-related operations. For example, the game player may control the controlled object in the game to perform an attack operation. The first controlled object in the embodiments of this application belongs to the first group in the virtual game scene, and the attack operation performed by the first controlled object is the first attack operation. In a case that the player controls the first controlled object in the virtual game scene to perform the first attack operation, a type of the first attack operation may be obtained in the embodiments of this application. The type of the first attack operation may include a normal attack operation and a skill attack operation. Attack ranges of the normal attack operation and the skill attack operation may have different sizes. In the embodiments of this application, a target range corresponding to the first attack operation performed by the first controlled object may be determined first after the first attack operation performed by the first controlled object is obtained. The target range in the embodiments of this application may include an attack range and a search range of the first attack operation performed by the first controlled object, and the search range may be located outside the attack range and is adjacent to the attack range. An objective of obtaining the target range in the embodiments of this application is to expand a search range for to-be-attacked objects. Compared with searching only the obtained attack range of the attack operation for a to-be-attacked target, the target attack object may be determined from more to-be-attacked objects, thereby improving the accuracy of determining a target attack object.

In the technical solution provided in step S204, after the target range is obtained, it may be determined to search the target range for a to-be-attacked object in the embodiments of this application. The to-be-attacked object belongs to the second group in the virtual game scene, and the second group and the first group are two opposing groups. A type of the to-be-attacked object may include, but is not limited to, a second controlled object, for example, a hero, controlled by a player. The to-be-attacked object may also be an object, for example, a creep, a ghost, a pet, a tower, a big dragon, a small dragon or a monster, controlled by a computer. There may be to-be-attacked objects in the target range, or there may be no to-be-attacked object in the target range. In a case that there is no to-be-attacked object in the target range, in the embodiments of this application, the first controlled object may be controlled to perform the first attack operation in situ, and in a case that there is an to-be-attacked object in the target range, there may be one or more to-be-attacked objects in the target range. In a case that there is one to-be-attacked object in the target range, the to-be-attacked object may be directly determined as the target attack object; and in a case that there are a plurality of to-be-attacked objects in the target range, the target attack object may be determined from the plurality of to-be-attacked objects, so that the first controlled object is controlled to perform the first attack operation on the target to-be-attacked object in the virtual game scene.

Optionally, in the embodiments of this application, the target attack object may be determined from the to-be-attacked objects according to priorities of the to-be-attacked objects and attribute values of the to-be-attacked objects. The following focuses on how to determine the target attack object from the to-be-attacked objects in the target range.

In an optional embodiment, in a case that there are the to-be-attacked objects in the target range, and before the determining the target attack object from the to-be-attacked objects according to the attribute values of the to-be-attacked objects, the embodiment may include the following step:

Step S203. An electronic apparatus obtains a priority order of the to-be-attacked objects, the priority order being used for indicating a preference order of determining the target attack object from the to-be-attacked objects.

The priority order of the to-be-attacked objects may be used for indicating a preference order of determining the target attack object from the to-be-attacked objects. Optionally, the priority order of the to-be-attacked objects obtained according to the attribute values of the to-be-attacked objects may include at least one of the following:

an obtained priority of a to-be-attacked object in the attack range is higher than a priority of a to-be-attacked object in the search range; and an obtained priority of a second controlled object in the to-be-attacked objects in the attack range is higher than a priority of an object other than the second controlled object in the to-be-attacked objects. The second controlled object may be an object that is in the second group and is controlled by a player in the virtual scene, for example, a hero, and an object other than the second controlled object in the to-be-attacked objects may be an object controlled by a computer, for example, a creep, a ghost, a pet, a tower, a big dragon, a small dragon, a monster; and an obtained priority of the second controlled object in the to-be-attacked objects in the search range is higher than a priority of an object other than the second controlled object in the to-be-attacked objects.

For example, in a game client of Honor of Kings, the priority order of the to-be-attacked objects in a descending order is: a hero in the attack range, a hero in the search range, a ghost in the attack range, a pet in the attack range, a tower in the attack range, a big dragon or a small dragon in the attack range, a creep in the attack range, a monster in the attack range, a ghost in the search range, a pet in the search range, a tower in the search range, a big dragon or a small dragon in the search range, a creep in the search range, and a monster in the search range.

The priority order in the embodiments of this application may be adaptively adjusted according to requirements of an actual application scenario.

After the priority order of the to-be-attacked objects is obtained, an attack object with the highest priority is determined as the target attack object in the embodiments of this application. However, in an actual application scenario, there may be a plurality of attack objects with the highest priority. For example, there are a plurality of heroes controlled by enemy game players in the attack range. In this case, the target attack object cannot be accurately determined by using the priority order of the to-be-attacked objects.

To resolve the problem that the target attack object cannot be accurately determined in a case that there are a plurality of attack objects with the highest priority, in the embodiments of this application, the target attack object may be determined from the to-be-attacked objects according to the attribute values of the to-be-attacked objects in a case that there are a plurality of attack objects with the highest priority in the to-be-attacked objects in the target range. The attribute value of the to-be-attacked object may include: the reduced health value of the to-be-attacked object after the first attack operation is performed on the to-be-attacked object, and/or, the reduced health value of the object in the first group after the second attack operation of the to-be-attacked object is performed on the object.

In an optional embodiment, the determining the target attack object from the to-be-attacked objects according to the attribute values of the to-be-attacked objects may include the following three cases:

Case 1: In a case that the attribute value of the to-be-attacked object includes the reduced health value of the to-be-attacked object after the first attack operation is performed on the to-be-attacked object, the determining the target attack object from the to-be-attacked objects according to the attribute values of the to-be-attacked objects may include: determining the target attack object from the to-be-attacked objects according to the reduced health value of the to-be-attacked object after the first attack operation is performed on the to-be-attacked object, a reduced health value of the target attack object after the first attack operation is performed on the target attack object being greater than a reduced health value of an attack object other than the target attack object in the to-be-attacked objects after the first attack operation is performed on the attack object.

Optionally, the determining the target attack object from the to-be-attacked objects according to the reduced health value of the to-be-attacked object after the first attack operation is performed on the to-be-attacked object may include: obtaining, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to 0; and determining the target attack object from the to-be-attacked objects according to the first estimated time, a first estimated time of attacking the target attack object by the first controlled object being less than a first estimated time of attacking an attack object other than the target attack object in the to-be-attacked objects by the first controlled object.

In Case 1, in the embodiment, an attack object that is easier to kill may be selected from the to-be-attacked objects as the target attack object. A larger reduced health value of the to-be-attacked object after the first controlled object performs the first attack operation on the to-be-attacked object indicates a shorter first estimated time of attacking the to-be-attacked object by the first controlled object. That is, the to-be-attacked object is easier to kill.

Case 2: In a case that the attribute value of the to-be-attacked object includes the reduced health value of the object in the first group after the second attack operation of the to-be-attacked object is performed on the object, the determining the target attack object from the to-be-attacked objects according to the attribute values of the to-be-attacked objects may include: determining the target attack object from the to-be-attacked objects according to the reduced health value of the object in the first group after the second attack operation of the to-be-attacked object is performed on the object, a reduced health value of the object in the first group after the second attack operation of the target attack object is performed on the object being greater than a reduced health value of an object in the first group after an second attack operation of an attack object other than the target attack object in the to-be-attacked objects is performed on the object.

Optionally, the determining the target attack object from the to-be-attacked objects according to the reduced health value of the object in the first group after the second attack operation of the to-be-attacked object is performed on the object may include: obtaining, according to the reduced health value of the object in the first group after the second attack operation of the to-be-attacked object is performed on the object, a second estimated time of attacking the object in the first group by the to-be-attacked object, the second estimated time being an average value of time required for the to-be-attacked object to repeatedly perform the second attack operation on each object in the first group to reduce a health value of each object in the first group to 0; and determining the target attack object from the to-be-attacked objects according to the second estimated time, a second estimated time of attacking the object in the first group by the target attack object being less than a second estimated time of attacking the object in the first group by an attack object other than the target attack object in the to-be-attacked objects.

The second attack operation may be an attack operation performed by the to-be-attacked object on each object in the first group. The second attack operation may be performed after the first attack operation is performed or may be performed before the first attack operation is performed, which is not specifically limited herein. In Case 2, in this embodiment, an attack object which poses the greatest threat to a teammate may be selected from the to-be-attacked objects as the target attack object. A larger reduced health value of the object in the first group after the second attack operation of the target attack object is performed on the object indicates a shorter second estimated time of attacking the object in the first group by the to-be-attacked object. That is, the to-be-attacked object poses the greatest threat to a teammate.

Case 3: In a case that the attribute value of the to-be-attacked object includes: the reduced health value of the to-be-attacked object after the first attack operation is performed on the to-be-attacked object, and, the reduced health value of the object in the first group after the second attack operation of the to-be-attacked object is performed on the object, the determining the target attack object from the to-be-attacked objects according to the attribute values of the to-be-attacked objects may include: obtaining, according to the reduced health value of the to-be-attacked object after the first attack operation is performed on the to-be-attacked object, and, the reduced health value of the object in the first group after the second attack operation of the to-be-attacked object is performed on the object, a first estimated time of attacking the to-be-attacked object by the first controlled object and a second estimated time of attacking the object in the first group by the to-be-attacked object, the first estimated time being a time required for the first controlled object to repeatedly perform the first attack operation on the to-be-attacked object to reduce the health value of the to-be-attacked object to 0, and the second estimated time being an average value of time required for the to-be-attacked object to repeatedly perform the second attack operation on each object in the first group to reduce a health value of each object in the first group to 0; and determining the target attack object from the to-be-attacked objects according to the first estimated time and the second estimated time.

Case 3: In this embodiment, the target attack object may be determined from the to-be-attacked objects by comprehensively considering impacts in two aspects of the first estimated time of attacking the to-be-attacked object by the first controlled object and the second estimated time of attacking the object in the first group by the to-be-attacked object.

Optionally, the determining the target attack object from the to-be-attacked objects according to the first estimated time and the second estimated time may include: obtaining a weighted value of the to-be-attacked object according to the first estimated time and the second estimated time; and determining an attack object with the smallest weighted value from the to-be-attacked objects as the target attack object.

A smaller weighted value of the to-be-attacked object indicates a shorter first estimated time of attacking the to-be-attacked object by a first attack object, and a shorter distance for the to-be-attacked object to attack the object in the first group indicates that the to-be-attacked object is easier to kill and the to-be-attacked object poses the greatest threat to a teammate. Therefore, in the embodiments of this application, the attack object with the smallest weighted value may be determined from the to-be-attacked objects as the target attack object.

Optionally, in the embodiments of this application, a method for obtaining the weighted value of the to-be-attacked object may be determined according to different types of the to-be-attacked objects. Specifically:

In the embodiments of this application, for the second controlled object, for example, a hero, in the to-be-attacked objects, a weight of the second controlled object may be obtained according to the first estimated time of attacking the second controlled object by the first controlled object and the second estimated time of attacking the object in the first group by the second controlled object, the first estimated time being a time required for the first controlled object to repeatedly perform the first attack operation on the second controlled object to reduce the health value of the second controlled object to 0, and the second estimated time being an average value of time required for the second controlled object to repeatedly perform the second attack operation on each object in the first group to reduce a health value of each object in the first group to 0.

The attack operation may include a normal attack operation and a skill attack operation. A damage value of the normal attack operation may be:

$Tmp1$=physical attack value+critical hit rate*critical hit damage*physical attack value.

A damage value of the skill attack operation may be:

$Tmp2$=normal damage+magic attack value*magic attack value bonus+physical attack value*physical attack value bonus.

The physical attack value, the critical hit rate, the critical hit damage, the normal damage, the magic attack value, the magic attack value bonus, and the physical attack value bonus are all related to the types of the attack operations. Values of the foregoing parameters are not specifically limited herein, and the values of the foregoing parameters may be determined according to the different types of attack operations.

Optionally, in the embodiments of this application, the first estimated time may be obtained by using the following steps: starting timing in a case that the first controlled object starts to perform the first attack operation on the second controlled object, stopping timing when the health value of the second controlled object is reduced to 0, and further determining a timing result as the first estimated time. During the timing, the first controlled object performs the first attack operation on the second controlled object once at an interval of a predetermined attack cooldown, to reduce the health value of the second controlled object to a health value corresponding to the first attack operation.

Optionally, in the embodiments of this application, the second estimated time may be obtained by using the following steps: separately obtaining a plurality of times required for the second controlled object to perform the second attack operation on each object in the first group to reduce a health value of each object in the first group to 0; and then averaging the plurality of times, and using the average value as the second estimated time. Optionally, the separately obtaining a plurality of times required for the second controlled object to perform the second attack operation on each object in the first group to reduce a health value of each object in the first group to 0 may be implemented by using the following steps: starting timing in a case that the second controlled object starts to perform the second attack operation on any object in all objects, stopping timing when a health value of the any object is reduced to 0, and further determining a time required for the health value of the any object to be reduced to 0 as a timing result. During the timing, the second controlled object performs the second attack operation on the any object once at an interval of the predetermined attack cooldown, to reduce the health value of the any object by a health value corresponding to the second attack operation.

Different attack operations may have different cooldowns, and the predetermined attack cooldown of the attack operation is not specifically limited in the embodiments of this application. In the embodiments of this application, the attack operation may be one attack operation, or may be a set of attack operations, and the set of attack operations may include a plurality of attack operations. For example, a set of attack operations may include a normal attack operation or may include a skill attack operation. In the case of one attack operation, the attack operation may need to be performed a plurality of times to reduce the health value of the second controlled object or a health value of each object in the first group to 0; and in the case of a group of attack operations, merely one or more of the attack operations may need to be performed to reduce the health value of the second controlled object or the health value of each object in the first group to 0. Therefore, in the embodiments of this application, the health value of the second controlled object or the health value of each object in the first group may be obtained once every time an attack operation is performed, thereby achieving an objective of accurately determining the first estimated time and the second estimated time.

In the embodiments of this application, after the first estimated time and the second estimated time are obtained, the weighted value of the to-be-attacked object may be obtained according to the first estimated time and the second estimated time, and the weighted value may be specifically calculated according to the following formula:

$$C = \begin{cases} -1000 \times \frac{1}{(1+A)\times(1+B)} \times \frac{3.5}{1+A}, & A < 2.5 \\ -1000 \times \frac{1}{(1+A)\times(1+B)}, & A \geq 2.5 \end{cases}$$

where C represents the weight of the to-be-attacked object, A represents the first estimated time, and B represents the second estimated time.

In the embodiments of this application, for an object other than the second controlled object in the to-be-attacked objects, a health value of the object may be determined as a weighted value of the object. Specifically, for a monster, a weighted value of the monster may be a distance between the monster and the first controlled object.

In the embodiments of this application, the target attack object may be accurately determined from the to-be-attacked objects based on the priority and the weighted value, and the determined target attack object is easier to kill and/or poses the greatest threat to a teammate. Compared with a conventional method of determining a target attack object based on the lowest health points and the shortest distance, the determined target attack object may be more accurate, thereby improving the gaming experience of a player.

In the technical solutions provided in step S206, after the target attack object is determined from the to-be-attacked objects in the target range, the determined target object may be inside the attack range of the first attack operation or may be outside the attack range of the first attack operation but inside the search range. In a case that the target attack object is inside the attack range, in the embodiments of this application, the first controlled object may be directly controlled to perform the first attack operation on the target attack object in the virtual game scene. In a case that the target attack object is outside the attack range but inside the search range, in the embodiments of this application, the first controlled object may be controlled first to move in the virtual game scene to enable the target attack object to be located inside an attack range of the first controlled object after the movement, and the first controlled object may then be controlled to perform the first attack operation on the target attack object.

In the embodiments of this application, a search range is added, an attack range and a search range of an attack operation are searched for to-be-attacked objects, and a target attack object is determined according to attribute values of the to-be-attacked objects. The first controlled object is controlled to move toward the target attack object in a case that the target attack object is outside the attack range but inside the search range, to enable the target attack object to be located inside the attack range of the first attack operation, so as to attack the target attack object. Therefore, an objective of accurately determining the target attack object can be achieved, thereby improving the accuracy of determining an attack object in a game, and improving the gaming experience of a game player.

In an optional embodiment, in a process of controlling the first controlled object to perform the first attack operation on the target attack object in the virtual game scene, this embodiment may further include: controlling the first controlled object to stop performing the first attack operation on the target attack object in a case that a predetermined attack stop condition is satisfied.

In the process of controlling the first controlled object to perform the first attack operation on the target attack object in the virtual game scene, in this embodiment, it may be detected in real time whether the predetermined attack stop condition is satisfied. The predetermined attack stop condition may include, but is not limited to that: the health value of the target attack object is reduced to 0, and the target attack object is moved outside the target range. In a case that it is detected that the predetermined attack stop condition is satisfied, in this embodiment, the first controlled object may be controlled to stop performing the first attack operation on the target attack object.

In this embodiment, it is detected in real time whether the predetermined attack stop condition is satisfied in a process of performing the first attack operation on the target attack object. Therefore, the first attack operation performed on the target attack object may be stopped after the predetermined attack stop condition is satisfied, so that it is convenient to immediately start determination in a next attack operation procedure.

In the embodiments of this application, the attack operation performing method may be performed by a client. In the embodiments of this application, a gaming process may be jointly performed by a plurality of clients, so that a frame synchronization technology may be adopted for the synchronization of game data of a plurality of clients. Specifically, each client may report an attack operation to a server, and the server collects all attack operations reported by the clients at a fixed frame, combines the attack operations into an attack operation set, and distributes the attack operation set to each client. After receiving the attack operation set transmitted by the server, each client may perform the attack operations in the attack operation set in a performing order, and displays a result of performing the attack operation set at the client. In this case, the synchronization of game data of a plurality of clients can be achieved, thereby avoiding a phenomenon of freezes in a game, and achieving an objective of improving the gaming experience of a game player.

An exemplary embodiment is further provided in this application, and the exemplary embodiment provides an attack target determining solution based on a mobile phone MOBA game.

Figure 3:
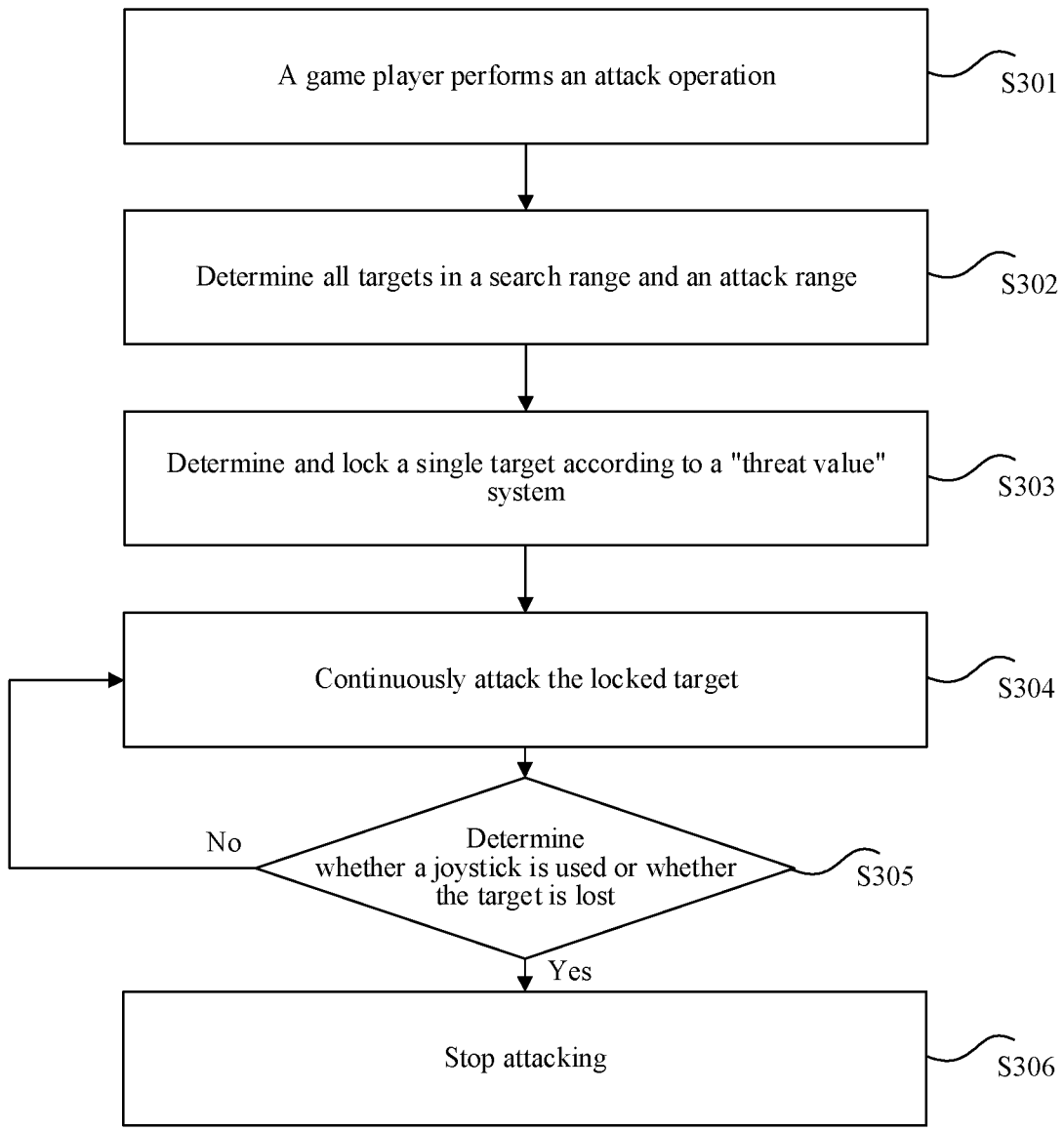
FIG. 3 is a flowchart of a game attack according to an exemplary embodiment of this application.

An entire game attack procedure throughout one attack is shown in FIG. 3, and may specifically include the following steps:

Step S301. A game player performs an attack operation.
Determination of a complete attack procedure is started for each attack.

Step S302. Determine all targets in a search range and an attack range.

Figure 4:
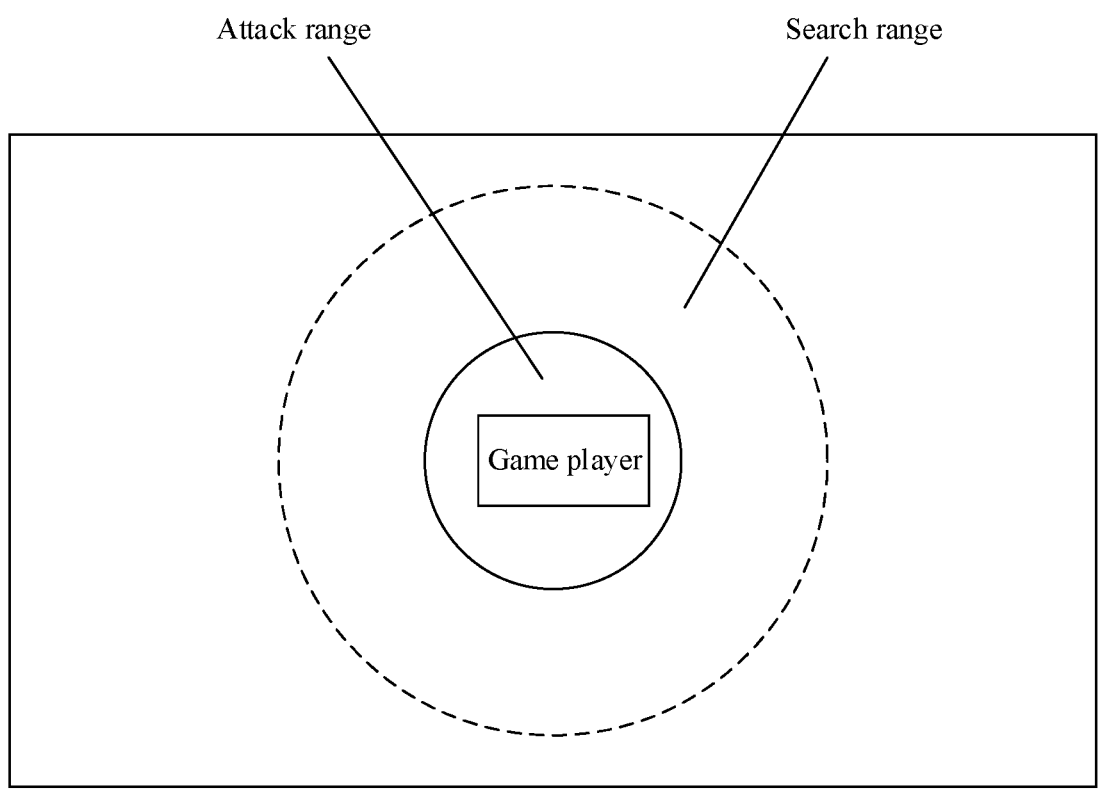
FIG. 4 is a schematic diagram of a search range and an attack range according to an exemplary embodiment of this application.

There are two determination ranges of the attack operation, which are, as shown in FIG. 4, an attack range (a solid circle shown in FIG. 4) and a search range (a range between the solid circle and a dotted circle shown in FIG. 4). The search range may be configured in a table, which is set by default at a predetermined distance, for example, 200 yards, outside the attack range.

The attack range and the search range are searched for any target. In a case that no target is found, an attack action is performed in situ and the attack is stopped. In a case that a target is found, step S303 is performed.

Step S303. Determine and lock a single target according to a "threat value" system.

More than one target is usually found, and a specific target is determined by using the "threat value" system in the exemplary embodiment. Once the target is determined, the target may be locked by a normal attack. The "threat value" system may be described in detail as follows.

Step S304. Continuously attack the locked target.

In a case that the locked target is inside the attack range, the target may be attacked continuously. In a case that the locked target is outside the attack range, a hero controlled by the player may move toward the target to enable the target to be located inside the attack range and continuously attack the target. In the exemplary embodiment, it may be continuously determined whether the player uses a joystick or whether the locked target is lost.

Step S305. Determine whether a joystick is used or whether the target is lost.

In a case that the player uses a joystick or the locked target is lost during the continuous attack, the attack is stopped, or otherwise, the locked target is attacked continuously. Cases in which the target is lost may include that: the target disappears in the field of vision, the target leaves the search range or the target is dead.

Step S306. Stop attacking. That is, the game player stops attacking the target, and enters the procedure again in a next attack.

The "threat value" system in the exemplary embodiment is described below in detail.

In a case that a game player performs a normal attack or intelligent casting, a plurality of targets are usually found in the search range and the attack range. To resolve the problem of how to determine a specific target from the plurality of targets, the "threat value" system is introduced in the exemplary embodiment. Rules are as follows:

Two attributes, namely, "priority" and "weight", are assigned to each found target.

The priorities of found targets are determined first, and a target with a high priority is determined as a target to be attacked. In a case that there are a plurality of targets with a high priority, the weights of these targets are then compared to determine a target with a small weighted value as a target to be attacked.

(1) Priority

The priority order in the exemplary embodiment may be:

InRange_Hero>OutRange_Hero>InRange_Ghost>InRange_Pet>InRange_Tower>InRange_Dragon>InRange_Creep>InRange_Monster>OutRange_Ghost>OutRange_Pet>OutRange_Tower>OutRange_Dragon>OutRange_Creep>OutRange_Monster The terms used above may be explained as follows: InRange is an attack radius; OutRange is a search radius; Hero is an enemy hero; Ghost is a ghost; Pet is a pet; Tower is a tower; Dragon is a big dragon or a small dragon; Creep is a creep; and Monster is a monster. Where ">" represents that the priorities are in descending order.

(2) Weight

A weight of a hero is mainly calculated with reference to "predetermined time to kill an enemy target" and a "predetermined time for a target to kill a teammate". The "predetermined time for a target to kill a teammate" is an average value of time for the target to kill each teammate, and is a negative calculated by using a series of formulas. To put it simply, in a case that a target is more vulnerable to damage and has lower health points, the target has a smaller weighted value and is more likely to become a target to be attacked. A weight of another object is equal to a health value. Specifically, a weight of a monster is equal to a distance.

The following focuses on a formula for calculating a weight of a hero.

For convenience, abbreviations of some terms are provided herein.

A damage of a normal attack is dmgA, and a cooldown of a normal attack is cdA.

A damage of skill 1 is dmgQ, and a cooldown of skill 1 is cdQ.

A damage of skill 2 is dmgW, and a cooldown of skill 2 is cdW.

A damage of skill 3 is dmgR, and a cooldown of skill 3 is cdR.

A method for calculating a damage of a normal attack (dmgA) is:

A damage Tmp without calculating defense is obtained first, and the damage of a normal attack is calculated by introducing Tmp into the defense of the attack object.

$$Tmp = AD + \text{critical hit rate} * \text{critical hit damage} * AD$$

where the physical attack value AD, the critical hit damage, and the critical hit rate are read from actual data of a character.

Methods for Calculating skill damages (dmgQ, dmgW, and dmgR):

A damage Tmp without calculating defense is obtained first, and the skill damage is calculated by introducing Tmp and the damage types into the defense of the attack object.

$$Tmp = \text{base damage} + AP * AP \text{ bonus} + AD * AD \text{ bonus}$$

where the base damage, the AP bonus, the AD bonus, and the damage types are read from base_damages, ap_bonus, ad_bonus, damage_type in an ability table respectively, which need to be planned for configuration. However, the physical attack value AD and the magic attack value AP are read from the actual data of the character.

A method for calculating an estimated time to kill:

Assuming that an attacker causes damages of dmgA+dmgQ+dmgW+dmgR to an attack object at a moment 0, the normal attack and skills of the attacker may then be in a cooldown. The attacker causes damage of dmgA every cdA, causes damage of dmgQ every cdQ, . . . , and the time obtained when the current HP value of the attack object is zero or negative is the estimated time to kill.

In a case that a "predetermined time to kill an enemy target" is A and an "average time for a target to kill a teammate" is B, and a method for calculating a weight C of a hero is:

in a case that $A < 2.5$, $$C = -1000 \times \frac{1}{(1+A) \times (1+B)} \times \frac{3.5}{1+A}, \text{ and}$$

in a case that $A >= 2.5$, $C = -1000 \times \frac{1}{(1+A) \times (1+B)}$.

Figure 5:
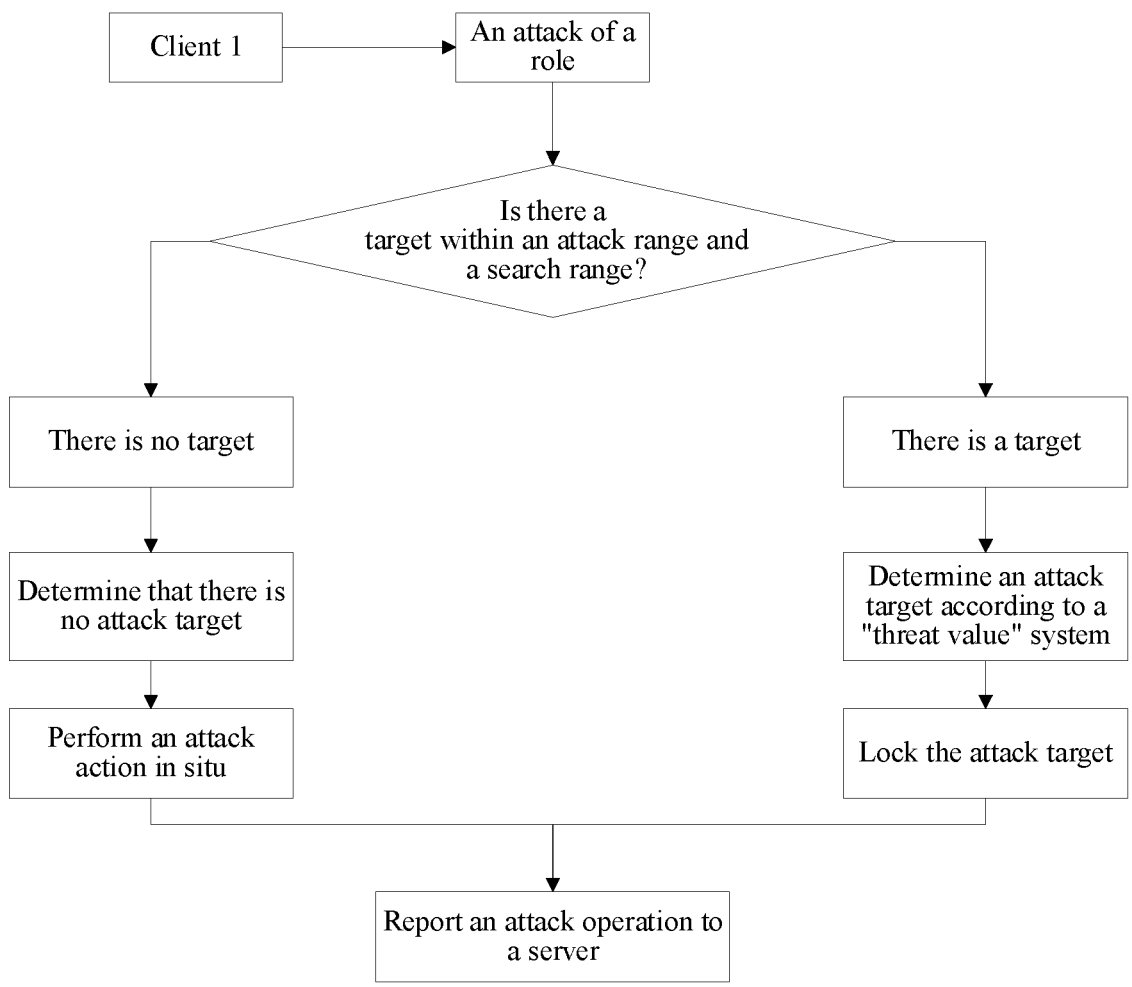
FIG. 5 is a schematic diagram of an attack target determining procedure performed by a client according to an exemplary embodiment of this application.

The foregoing attack target determining procedure in the exemplary embodiment may be performed by a client, and an attack operation may be reported to a server after determination is finished. As shown in FIG. 5, in a case that an attack of a role is detected, a client 1 first searches an attack range and a search range for a target. In a case that there is a target, the client 1 determines an attack target according to the foregoing "threat value" system, and locks the attack target. In a case that there is no target, the client 1 determines that there is no attack target, and performs an attack action in situ. The client then reports an attack operation to a server.

Figure 6:
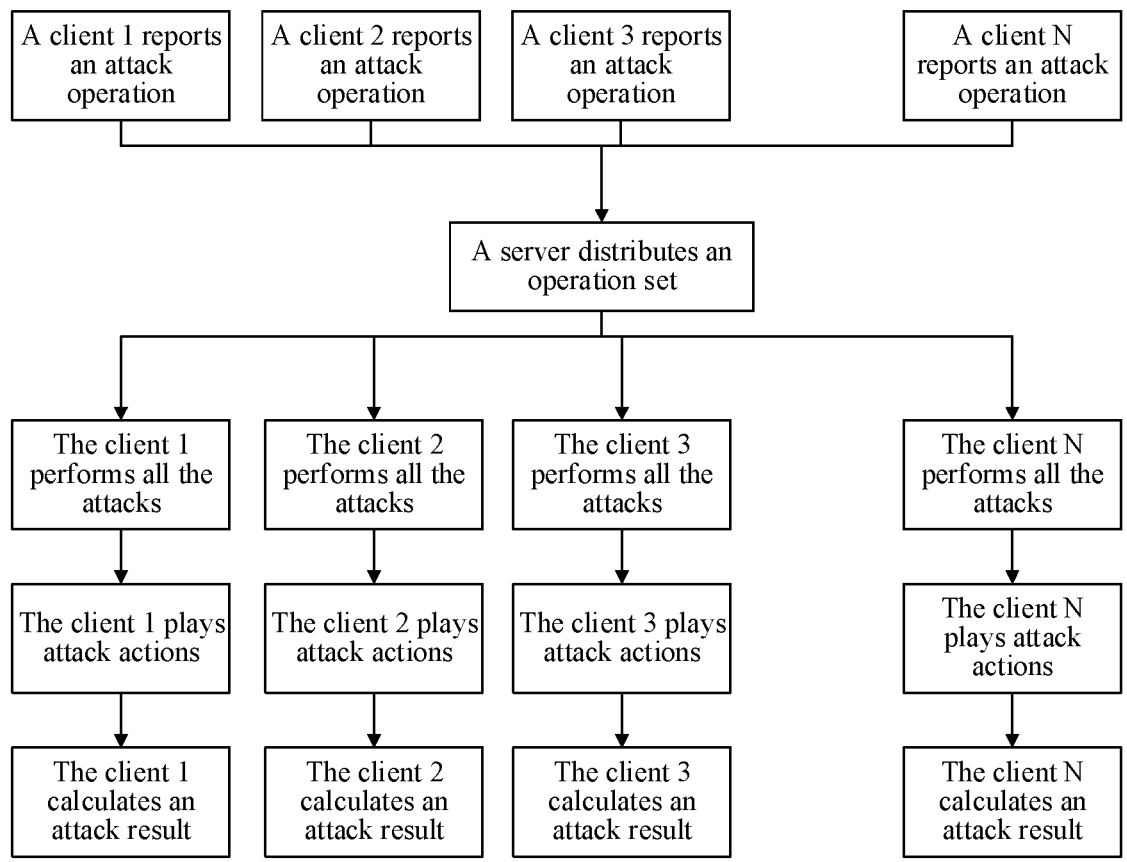
FIG. 6 is a schematic diagram of communication between a client and a server according to an exemplary embodiment of this application.

The client may communicate with the server based on the frame synchronization technology. As shown in FIG. 6, the server collects operation performing requests initiated by all clients in a single round of game in a fixed frame time. That is, each of a client 1, a client 2, . . . , and a client N shown in FIG. 6 reports an attack operation. The server combines attack operations reported by all the clients into an operation set, and distributes the operation set to all the clients in the single round of game. Each client separately performs all the attack operations according to the combined operation set. After all the attack operations are performed, the attack action may be played at each client, and each client may calculate an attack result. An objective of synchronizing game results of a plurality of clients can be achieved by using the foregoing procedures.

By means of the embodiments of this application, a player can know about a skill range, and an attribute "threat value" is assigned to each target in the attack target determining process. The "threat value" is a result calculated by using a plurality of parameters, so that every attack is accurate and an attack object is a target that poses the greatest threat to a teammate, thereby helping the player to choose the optimal target during an attack.

The embodiments of this application may be applied to MOBA mobile games. A threat value of an attack target is calculated by using various types of parameters and formulas to help a player choose the optimal attack target. A range setting related to an attack is simplified to enable a player to know about an effective range of the attack, thereby reducing misoperations of the player. Eventually, the player can attack a most desired and most worthwhile target during a battle, thereby obtaining desirable gaming experience.

The foregoing method embodiments are expressed as a series of action combinations for the purpose of brief description, but a person skilled in the art is to know that because some steps may be performed in other sequences or simultaneously according to the embodiments of this application, the embodiments of this application are not limited to a described action sequence. In addition, a person skilled in the art is also to know that the embodiments described in this specification are all exemplary embodiments; and therefore, an action and a module involved are not necessarily mandatory in the embodiments of this application.

According to the foregoing descriptions of implementations, a person skilled in the art may clearly know that the method according to the foregoing embodiments may be implemented by using software and a necessary general hardware platform, or certainly may be implemented by using hardware. However, in most cases, the former is an exemplary implementation. Based on such an understanding, the technical solutions of the embodiments of this application essentially or the part contributing to the related art may be implemented in a form of a software product. The computer software product is stored in a storage medium (such as a read-only memory (ROM)/random access memory (RAM), a magnetic disk, or an optical disc) and includes several instructions for instructing a terminal device (which may be a mobile phone, a computer, a server, a network device, or the like) to perform the methods described in the embodiments of this application.

Figure 7:
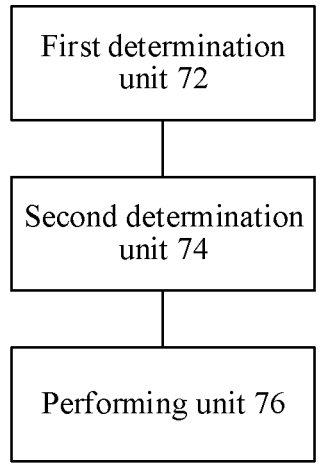
FIG. 7 is a schematic diagram of an optional attack operation performing apparatus according to an embodiment of this application.

According to another aspect of the embodiments of this application, an attack operation performing apparatus for implementing the foregoing attack operation performing method is further provided. FIG. 7 is a schematic diagram of an optional attack operation performing apparatus according to an embodiment of this application. The apparatus may include one or more processors and one or more memories storing program units, the program units being executed by the processor. As shown in FIG. 7, the program units may include:

a first determination unit 72, configured to determine, in a virtual scene of a client, a target range corresponding to a first attack operation performed by a first controlled object in the virtual scene, the target range including an attack range of the first attack operation, the first controlled object belonging to a first group in the virtual scene; a second determination unit 74, configured to determine a target attack object from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object; and a performing unit 76, configured to control the first controlled object to perform the first attack operation on the target attack object in the virtual scene.

The first determination unit 72 in this embodiment may be configured to perform step S202 in the embodiments of this application, the second determination unit 74 in this embodiment may be configured to perform step S204 in the embodiments of this application, and the performing unit 76 in this embodiment may be configured to perform step S206 in the embodiments of this application.

Implemented examples and application scenarios of the foregoing modules and corresponding steps are the same, but are not limited to the content disclosed by the foregoing embodiments. The foregoing modules can run on the hardware environment shown in FIG. 1 as a part of the apparatus, and may be implemented by software, or may be implemented by hardware.

In an optional embodiment, in a case that the attribute value of the to-be-attacked object includes a reduced health value of the to-be-attacked object after the first attack operation is performed on the to-be-attacked object, the second determination unit 74 may include: a first determination module, configured to determine the target attack object from the to-be-attacked objects according to the reduced health value of the to-be-attacked object after the first attack operation is performed on the to-be-attacked object, a reduced health value of the target attack object after the first attack operation is performed on the target attack object being greater than a reduced health value of an attack object other than the target attack object in the to-be-attacked objects after the first attack operation is performed on the attack object.

Optionally, the first determination module may include: a first obtaining submodule, configured to obtain, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to 0; and a first determining submodule, configured to determine the target attack object from the to-be-attacked objects according to the first estimated time, the first estimated time of attacking the target attack object by the first controlled object being less than a first estimated time of attacking an attack object other than the target attack object in the to-be-attacked objects by the first controlled object.

In an optional embodiment, in a case that the attribute value of the to-be-attacked object includes the reduced health value of the object in the first group after the second attack operation of the to-be-attacked object is performed on the object, the second determination unit 74 may include: a second determination module, configured to determine the target attack object from the to-be-attacked objects according to the reduced health value of the object in the first group after the second attack operation of the to-be-attacked object is performed on the object, a reduced health value of the object in the first group after the second attack operation of the target attack object is performed on the object being greater than a reduced health value of an object in the first group after an second attack operation of an attack object other than the target attack object in the to-be-attacked objects is performed on the object.

Optionally, the second determination module may include: a second obtaining submodule, configured to obtain, according to the reduced health value of the object in the first group after the second attack operation of the to-be-attacked object is performed on the object, a second estimated time of attacking the object in the first group by the to-be-attacked object, the second estimated time being an average value of time required for the to-be-attacked object to repeatedly perform the second attack operation on each object in the first group to reduce a health value of each object in the first group to 0; and a second determining submodule, configured to determine the target attack object from the to-be-attacked objects according to the second estimated time, a second estimated time of attacking the object in the first group by the target attack object being less than a second estimated time of attacking the object in the first group by an attack object other than the target attack object in the to-be-attacked objects.

In an optional embodiment, in a case that the attribute value of the to-be-attacked object includes: the reduced health value of the to-be-attacked object after the first attack operation is performed on the to-be-attacked object, and, the reduced health value of the object in the first group after the second attack operation of the to-be-attacked object is performed on the object, the second determination unit 74 may include: a first obtaining module, configured to obtain, according to the reduced health value of the to-be-attacked object after the first attack operation is performed on the to-be-attacked object, and, the reduced health value of the object in the first group after the second attack operation of the to-be-attacked object is performed on the object, a first estimated time of attacking the to-be-attacked object by the first controlled object and a second estimated time of attacking the object in the first group by the to-be-attacked object, the first estimated time being a time required for the first controlled object to repeatedly perform the first attack operation on the to-be-attacked object to reduce the health value of the to-be-attacked object to 0, and the second estimated time being an average value of time required for the to-be-attacked object to repeatedly perform the second attack operation on each object in the first group to reduce a health value of each object in the first group to 0; and a third determination module, configured to determine the target attack object from the to-be-attacked objects according to the first estimated time and the second estimated time.

Optionally, the third determination module may include: a third obtaining submodule, configured to obtain a weighted value of the to-be-attacked object according to the first estimated time and the second estimated time; and a third determining submodule, configured to determine an attack object with the smallest weighted value from the to-be-attacked objects as the target attack object.

Optionally, the third obtaining submodule is configured to obtain a weight of the to-be-attacked object according to the following formula:

$$C = \begin{cases} -1000 \times \frac{1}{(1+A) \times (1+B)} \times \frac{3.5}{1+A}, & A < 2.5 \\ -1000 \times \frac{1}{(1+A) \times (1+B)}, & A \geq 2.5 \end{cases},$$

where C represents the weight of the to-be-attacked object, A represents the first estimated time, and B represents the second estimated time.

In an optional embodiment, the apparatus may further include: an obtaining unit, configured to obtain a priority order of the to-be-attacked objects before the target attack object is determined from the to-be-attacked objects according to the attribute values of the to-be-attacked objects in a case that there are the to-be-attacked objects in the target range, the priority order is used for indicating a preference order of determining the target attack object from the to-be-attacked objects; and a third determination unit, configured to determine an attack object with the highest priority in the to-be-attacked objects as the target attack object. In a case that there are a plurality of attack objects with the highest priority in the to-be-attacked objects, the step of determining the target attack object from the to-be-attacked objects according to the attribute values of the to-be-attacked objects is performed.

Optionally, the target range includes the attack range and a search range, and the search range is located outside the attack range and adjacent to the attack range. The priority order of the to-be-attacked objects obtained by the obtaining unit may include at least one of the following: an obtained priority of a to-be-attacked object in the attack range is higher than a priority of a to-be-attacked object in the search range; an obtained priority of a second controlled object in the to-be-attacked objects in the attack range is higher than a priority of an object other than the second controlled object in the to-be-attacked objects, the second controlled object being an object controlled by a player in a virtual scene; and an obtained priority of the second controlled object in the to-be-attacked objects in the search range is higher than a priority of an object other than the second controlled object in the to-be-attacked objects.

In an optional embodiment, the performing unit 76 may include: a first performing module, configured to control the first controlled object to perform the first attack operation on the target attack object in the virtual scene in a case that the target attack object is inside the attack range; or a second performing module, configured to control the first controlled object to move in the virtual scene in a case that the target attack object is outside the attack range but inside the search range to enable the target attack object to be located inside an attack range of the first controlled object after the movement; and control the first controlled object to perform the first attack operation on the target attack object. The target range includes the attack range and a search range, and the search range is located outside the attack range and adjacent to the attack range.

In an optional embodiment, the performing unit 76 may include: a reporting module, configured to report the first attack operation to the server, the server being configured to combine attack operations reported by a plurality of clients into an attack operation set, and distribute the attack operation set to the plurality of clients, the attack operation set including the first attack operation; a receiving module, configured to receive the attack operation set transmitted by the server; and a third performing module, configured to perform the attack operation set in the virtual scene.

Implemented examples and application scenarios of the foregoing modules and corresponding steps are the same, but are not limited to the content disclosed by the foregoing embodiments. The foregoing modules can run on the hardware environment shown in FIG. 1 as a part of the apparatus, and may be implemented by software, or may be implemented by hardware.

By means of the foregoing modules, the technical problem of relatively low accuracy of determining an attack object in a game in the related art may be resolved, thereby achieving a technical effect of improving the accuracy of determining an attack object in a game, and further improving the gaming experience of a user.

According to still another aspect of the embodiments of this application, an electronic apparatus for implementing the foregoing attack operation performing method is further provided. The electronic apparatus may be a terminal.

Figure 8:
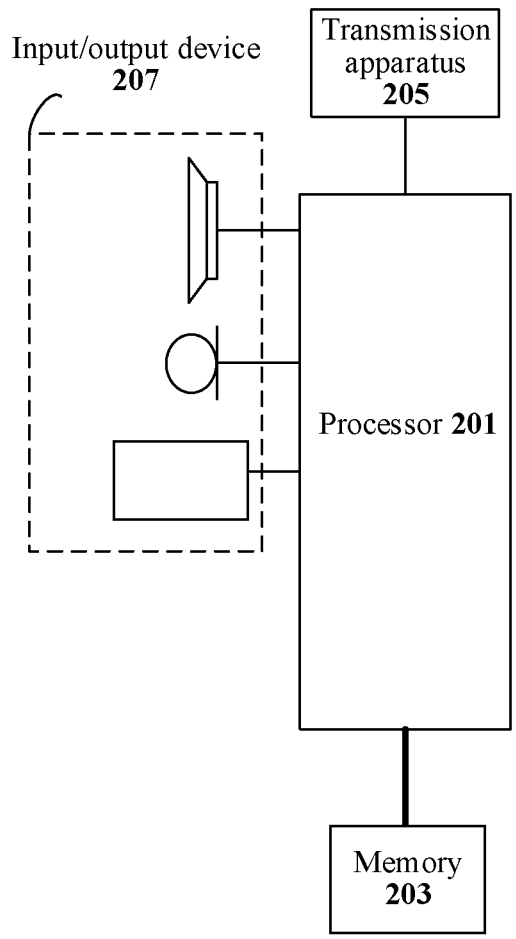
FIG. 8 is a structural block diagram of an electronic apparatus according to an embodiment of this application.

FIG. 8 is a structural block diagram of an electronic apparatus according to an embodiment of this application. As shown in FIG. 8, the electronic apparatus may include: one or more (only one processor is shown in the figure) processors 201 and a memory 203. The memory 203 may store a computer program, and the processor 201 may be configured to run the computer program to perform the attack operation performing method according to the embodiments of this application.

The memory 203 may be configured to store computer programs and modules, for example, program instructions/modules corresponding to the attack operation performing method and apparatus in the embodiments of this application. The processor 201 is configured to run the computer programs and modules stored in the memory 203, to perform various functional applications and data processing, to be specific, implement the foregoing attack operation performing method. The memory 203 may include a high-speed random memory, and may further include a non-volatile memory such as one or more magnetic storage apparatuses, a flash, or another non-volatile solid-state memory. In some examples, the memory 203 may further include memories remotely disposed relative to the processor 201, and these remote memories may be connected to a terminal through a network. Instances of the network include, but are not limited to, the Internet, an intranet, a local area network, a mobile communications network, and a combination thereof.

Optionally, as shown in FIG. 8, the electronic apparatus may further include a transmission apparatus 205 and an input/output device 207. The transmission apparatus 205 is configured to receive or transmit data through a network. Specific instances of the foregoing network may include a wired network and a wireless network. In an example, the transmission apparatus 205 includes a network interface controller (NIC), which may be connected to another network device and a router by using a cable, to communicate with the Internet or a local area network. In an example, the transmission apparatus 205 is a radio frequency (RF) module, which communicates with the Internet in a wireless manner.

A person of ordinary skill in the art may understand that, the structure shown in FIG. 8 is only schematic. The electronic apparatus may be a terminal device such as a smartphone (such as an Android mobile phone or an iOS mobile phone), a tablet computer, a palmtop computer, a mobile Internet device (MID), or a PAD. FIG. 8 does not limit the structure of the foregoing electronic apparatus. For example, the electronic apparatus may further include more or less components (such as a network interface and a display apparatus) than those shown in FIG. 8, or have configuration different from that shown in FIG. 8.

Optionally, in this embodiment, the memory 203 may be configured to store a computer program.

Optionally, in this embodiment, the processor may be configured to run the computer program to perform the following steps: determining, in a virtual scene of a client, a target range corresponding to a first attack operation performed by a first controlled object in the virtual scene, the target range including an attack range of the first attack operation, the first controlled object belonging to a first group in the virtual scene; determining a target attack object from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object; and controlling the first controlled object to perform the first attack operation on the target attack object in the virtual scene.

The processor 201 is further configured to perform the following step: in a case that the attribute value of the to-be-attacked object includes a reduced health value of the to-be-attacked object after the first attack operation is performed on the to-be-attacked object, determining the target attack object from the to-be-attacked objects according to the reduced health value of the to-be-attacked object after the first attack operation is performed on the to-be-attacked object, a reduced health value of the target attack object after the first attack operation is performed on the target attack object being greater than a reduced health value of an attack object other than the target attack object in the to-be-attacked objects after the first attack operation is performed on the attack object.

The processor 201 is further configured to perform the following steps: obtaining, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to 0; and determining the target attack object from the to-be-attacked objects according to the first estimated time, the first estimated time of attacking the target attack object by the first controlled object being less than a first estimated time of attacking an attack object other than the target attack object in the to-be-attacked objects by the first controlled object.

The processor 201 is further configured to perform the following step: in a case that the attribute value of the to-be-attacked object includes the reduced health value of the object in the first group after the second attack operation of the to-be-attacked object is performed on the object, determining the target attack object from the to-be-attacked objects according to the reduced health value of the object in the first group after the second attack operation of the to-be-attacked object is performed on the object, a reduced health value of the object in the first group after the second attack operation of the target attack object is performed on the object being greater than a reduced health value of an object in the first group after an second attack operation of an attack object other than the target attack object in the to-be-attacked objects is performed on the object.

The processor 201 is further configured to perform the following steps: obtaining, according to the reduced health value of the object in the first group after the second attack operation of the to-be-attacked object is performed on the object, a second estimated time of attacking the object in the first group by the to-be-attacked object, the second estimated time being an average value of time required for the to-be-attacked object to repeatedly perform the second attack operation on each object in the first group to reduce a health value of each object in the first group to 0; and determining the target attack object from the to-be-attacked objects according to the second estimated time, a second estimated time of attacking the object in the first group by the target attack object being less than a second estimated time of attacking the object in the first group by an attack object other than the target attack object in the to-be-attacked objects.

The processor 201 is further configured to perform the following steps: in a case that the attribute value of the to-be-attacked object includes: the reduced health value of the to-be-attacked object after the first attack operation is performed on the to-be-attacked object, and, the reduced health value of the object in the first group after the second attack operation of the to-be-attacked object is performed on the object, obtaining, according to the reduced health value of the to-be-attacked object after the first attack operation is performed on the to-be-attacked object, and, the reduced health value of the object in the first group after the second attack operation of the to-be-attacked object is performed on the object, a first estimated time of attacking the to-be-attacked object by the first controlled object and a second estimated time of attacking the object in the first group by the to-be-attacked object, the first estimated time being a time required for the first controlled object to repeatedly perform the first attack operation on the to-be-attacked object to reduce the health value of the to-be-attacked object to 0, and the second estimated time being an average value of time required for the to-be-attacked object to repeatedly perform the second attack operation on each object in the first group to reduce a health value of each object in the first group to 0; and determining the target attack object from the to-be-attacked objects according to the first estimated time and the second estimated time.

The processor 201 is further configured to perform the following steps: obtaining a weighted value of the to-be-attacked object according to the first estimated time and the second estimated time; and determining an attack object with the smallest weighted value from the to-be-attacked objects as the target attack object.

The processor 201 is further configured to perform the following step: obtaining a weight of the to-be-attacked object according to the following formula:

$$C = \begin{cases} -1000 \times \frac{1}{(1+A) \times (1+B)} \times \frac{3.5}{1+A}, & A < 2.5 \\ -1000 \times \frac{1}{(1+A) \times (1+B)}, & A \geq 2.5 \end{cases},$$

where C represents the weight of the to-be-attacked object, A represents the first estimated time, and B represents the second estimated time.

The processor 201 is further configured to perform the following steps: obtaining a priority order of the to-be-attacked objects before the target attack object is determined from the to-be-attacked objects according to the attribute values of the to-be-attacked objects in a case that there are the to-be-attacked objects in the target range, the priority order are used for indicating a preference order of determining the target attack object from the to-be-attacked objects; and determining an attack object with the highest priority in the to-be-attacked objects as the target attack object. In a case that there are a plurality of attack objects with the highest priority in the to-be-attacked objects, the step of determining the target attack object from the to-be-attacked objects according to the attribute values of the to-be-attacked objects is performed.

The processor 201 is further configured to perform the following steps: an obtained priority of a to-be-attacked object in the attack range is higher than a priority of a to-be-attacked object in the search range; an obtained priority of a second controlled object in the to-be-attacked objects in the attack range is higher than a priority of an object other than the second controlled object in the to-be-attacked objects, the second controlled object being an object controlled by a player in a virtual scene; and an obtained priority of the second controlled object in the to-be-attacked objects in the search range is higher than a priority of an object other than the second controlled object in the to-be-attacked objects. The target range includes the attack range and a search range, and the search range is located outside the attack range and adjacent to the attack range.

The processor 201 is further configured to perform the following steps: controlling the first controlled object to perform the first attack operation on the target attack object in the virtual scene in a case that the target attack object is inside the attack range; or controlling the first controlled object to move in the virtual scene in a case that the target attack object is outside the attack range but inside the search range, to enable the target attack object to be located inside an attack range of the first controlled object after the movement; and controlling the first controlled object to perform the first attack operation on the target attack object. The target range includes the attack range and a search range, and the search range is located outside the attack range and adjacent to the attack range.

The processor 201 is further configured to perform the following steps: reporting the first attack operation to a server, the server being configured to combine attack operations reported by a plurality of clients into an attack operation set, and distribute the attack operation set to the plurality of clients, the attack operation set including the first attack operation; receiving the attack operation set transmitted by the server; and performing the attack operation set in the virtual scene.

Optionally, for a specific example in this embodiment, reference may be made to the examples described in the foregoing embodiments, and details are not described in this embodiment again.

According to the embodiments of this application, a performing solution for a game attack operation is provided. In a virtual game scene of a client, a target range corresponding to a first attack operation performed by a first controlled object in the virtual game scene is determined, the target range including an attack range of the first attack operation, the first controlled object belonging to a first group in the virtual game scene; a target attack object is determined from to-be-attacked objects according to attribute values of the to-be-attacked objects in a case that there are the to-be-attacked objects in the target range, the to-be-attacked objects belonging to a second group in the virtual game scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object; and the first controlled object is controlled to perform the first attack operation on the target attack object in the virtual game scene. Therefore, an objective of accurately determining an attack object in a game is achieved, thereby resolving the technical problem of relatively low accuracy of determining an attack object in a game in the related art, achieving the technical effect of improving the accuracy of determining an attack object in a game, and improving the gaming experience of a user.

According to still another aspect of the embodiments of this application, a storage medium is further provided. The storage medium stores a computer program, the computer program being configured to perform the foregoing attack operation performing method in the embodiments when being run.

Optionally, in this embodiment, the storage medium may be located in at least one of a plurality of network devices in a network shown in the foregoing embodiment.

Optionally, in this embodiment, the storage medium is configured to store a computer program for performing the following steps:

S1. In a virtual scene of a client, determine a target range corresponding to a first attack operation performed by a first controlled object in the virtual scene, the target range including an attack range of the first attack operation, the first controlled object belonging to a first group in the virtual scene.

S2. Determine a target attack object from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object.

S3. Control the first controlled object to perform the first attack operation on the target attack object in the virtual scene.

Optionally, the storage medium is further configured to store a computer program for performing the following step: in a case that the attribute value of the to-be-attacked object includes a reduced health value of the to-be-attacked object after the first attack operation is performed on the to-be-attacked object, determining the target attack object from the to-be-attacked objects according to the reduced health value of the to-be-attacked object after the first attack operation is performed on the to-be-attacked object, a reduced health value of the target attack object after the first attack operation is performed on the target attack object being greater than a reduced health value of an attack object other than the target attack object in the to-be-attacked objects after the first attack operation is performed on the attack object.

Optionally, the storage medium is further configured to store a computer program for performing the following steps: obtaining, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to 0; and determining the target attack object from the to-be-attacked objects according to the first estimated time, a first estimated time of attacking the target attack object by the first controlled object being less than a first estimated time of attacking an attack object other than the target attack object in the to-be-attacked objects by the first controlled object.

Optionally, the storage medium is further configured to store a computer program for performing the following step: in a case that the attribute value of the to-be-attacked object includes the reduced health value of the object in the first group after the second attack operation of the to-be-attacked object is performed on the object, determining the target attack object from the to-be-attacked objects according to the reduced health value of the object in the first group after the second attack operation of the to-be-attacked object is performed on the object, a reduced health value of the object in the first group after the second attack operation of the target attack object is performed on the object being greater than a reduced health value of an object in the first group after an second attack operation of an attack object other than the target attack object in the to-be-attacked objects is performed on the object.

Optionally, the storage medium is further configured to store a computer program for performing the following steps: obtaining, according to the reduced health value of the object in the first group after the second attack operation of the to-be-attacked object is performed on the object, a second estimated time of attacking the object in the first group by the to-be-attacked object, the second estimated time being an average value of time required for the to-be-attacked object to repeatedly perform the second attack operation on each object in the first group to reduce a health value of each object in the first group to 0; and determining the target attack object from the to-be-attacked objects according to the second estimated time, a second estimated time of attacking the object in the first group by the target attack object being less than a second estimated time of attacking the object in the first group by an attack object other than the target attack object in the to-be-attacked objects.

Optionally, the storage medium is further configured to store a computer program for performing the following steps: in a case that the attribute value of the to-be-attacked object includes: the reduced health value of the to-be-attacked object after the first attack operation is performed on the to-be-attacked object, and, the reduced health value of the object in the first group after the second attack operation of the to-be-attacked object is performed on the object, obtaining, according to the reduced health value of the to-be-attacked object after the first attack operation is performed on the to-be-attacked object, and, the reduced health value of the object in the first group after the second attack operation of the to-be-attacked object is performed on the object, a first estimated time of attacking the to-be-attacked object by the first controlled object and a second estimated time of attacking the object in the first group by the to-be-attacked object, the first estimated time being a time required for the first controlled object to repeatedly perform the first attack operation on the to-be-attacked object to reduce the health value of the to-be-attacked object to 0, and the second estimated time being an average value of time required for the to-be-attacked object to repeatedly perform the second attack operation on each object in the first group to reduce a health value of each object in the first group to 0; and determining the target attack object from the to-be-attacked objects according to the first estimated time and the second estimated time.

Optionally, the storage medium is further configured to store a computer program for performing the following steps: obtaining a weighted value of the to-be-attacked object according to the first estimated time and the second estimated time; and determining an attack object with the smallest weighted value from the to-be-attacked objects as the target attack object.

Optionally, the storage medium is further configured to store a computer program for performing the following step: obtaining a weight of the to-be-attacked object according to the following formula:

$$C = \begin{cases} -1000 \times \dfrac{1}{(1+A) \times (1+B)} \times \dfrac{3.5}{1+A}, & A < 2.5 \\ -1000 \times \dfrac{1}{(1+A) \times (1+B)}, & A \geq 2.5 \end{cases},$$

where C represents the weight of the to-be-attacked object, A represents the first estimated time, and B represents the second estimated time.

Optionally, the storage medium is further configured to store a computer program for performing the following steps: obtaining a priority order of the to-be-attacked objects before a target attack object is determined from to-be-attacked objects according to attribute values of the to-be-attacked objects in a case that there are the to-be-attacked objects in the target range, the priority order being used for indicating a preference order of determining the target attack object from the to-be-attacked objects; and determining an attack object with the highest priority in the to-be-attacked objects as the target attack object. In a case that there are a plurality of attack objects with the highest priority in the to-be-attacked objects, the step of determining the target attack object from the to-be-attacked objects according to the attribute values of the to-be-attacked objects is performed.

Optionally, the storage medium is further configured to store a computer program for performing the following steps: an obtained priority of a to-be-attacked object in the attack range is higher than a priority of a to-be-attacked object in the search range; an obtained priority of a second controlled object in the to-be-attacked objects in the attack range is higher than a priority of an object other than the second controlled object in the to-be-attacked objects, the second controlled object being an object controlled by a player in a virtual scene; and an obtained priority of the second controlled object in the to-be-attacked objects in the search range is higher than a priority of an object other than the second controlled object in the to-be-attacked objects. The target range includes the attack range and a search range, and the search range is located outside the attack range and adjacent to the attack range.

Optionally, the storage medium is further configured to store a computer program for performing the following steps: controlling the first controlled object to perform the first attack operation on the target attack object in the virtual scene in a case that the target attack object is inside the attack range; or controlling the first controlled object to move in the virtual scene in a case that the target attack object is outside the attack range but inside the search range, to enable the target attack object to be located inside an attack range of the first controlled object after the movement; and controlling the first controlled object to perform the first attack operation on the target attack object. The target range includes the attack range and a search range, and the search range is located outside the attack range and adjacent to the attack range.

Optionally, the storage medium may further be configured to store a computer program for performing the following steps: reporting the first attack operation to a server, the server being configured to combine attack operations reported by a plurality of clients into an attack operation set, and distribute the attack operation set to the plurality of clients, the attack operation set including the first attack operation; receiving the attack operation set transmitted by the server; and performing the attack operation set in the virtual scene.

Optionally, for a specific example in this embodiment, reference may be made to the examples described in the foregoing embodiments, and details are not described in this embodiment again.

Optionally, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

The sequence numbers of the foregoing embodiments of this application are merely for the convenience of description, and do not imply the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of the embodiments of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of software functional unit.

The above descriptions are merely exemplary implementations of this application, and a person of ordinary skill in the art may make various improvements and modifications without departing from the spirit of the embodiments of this application. All such modifications improvements and modifications are to be construed as falling within the protection scope of the embodiments of this application.

INDUSTRIAL APPLICABILITY

According to the embodiments of this application, in a virtual scene of a client, a target range corresponding to a first attack operation performed by a first controlled object in the virtual scene is determined, the target range including an attack range of the first attack operation, the first controlled object belonging to a first group in the virtual scene; a target attack object is determined from to-be-attacked objects according to attribute values of the to-be-attacked objects in a case that there are the to-be-attacked objects in the target range, the to-be-attacked objects belonging to a second group in the virtual scene, and the attribute value of the to-be-attacked object including: a reduced health value of the to-be-attacked object after the first attack operation is performed on the to-be-attacked object, and/or, a reduced health value of an object in the first group after a second attack operation of the to-be-attacked object is performed on the object; and the first controlled object is controlled to perform the first attack operation on the target attack object in the virtual scene. Therefore, an objective of accurately determining an attack object in a game is achieved, thereby resolving the technical problem of relatively low accuracy of determining an attack object in a game in the related art, achieving the technical effect of improving the accuracy of determining an attack object in a game, and improving the gaming experience of a user.

What is claimed is:

1. A computer-implemented method of performing an attack operation in a game, performed by a respective computing device in a plurality of computing devices, the method comprising:

for the respective computing device:
determining, by the respective computing device, in a virtual scene of a client of the game running on the respective computing device, a target range corresponding to a first attack operation performed by a first controlled object in the virtual scene, the target range comprising an attack range of the first attack operation, and the first controlled object belonging to a first group in the virtual scene;

identifying to-be-attacked objects in the target range, the to-be-attacked objects belonging to a second group in the virtual scene;

determining a target attack object from the to-be-attacked objects according to attribute values of the to-be-attacked objects, and an attribute value of the to-be-attacked object comprising: a reduced health value of the to-be-attacked object after the first attack operation is performed on the to-be-attacked object, and, a reduced health value of an object in the first group after a second attack operation by the to-be-attacked object is performed on the object in the first group, further including:
determining the target attack object from the to-be-attacked objects according to a first estimated time and a second estimated time, wherein the first estimated time is a time required for the first controlled object to repeatedly perform the first attack operation on the to-be-attacked object to reduce a health value of the to-be-attacked object to 0 and the second estimated time being an average value of time required for the to-be-attacked object to repeatedly perform the second attack operation on each object in the first group to reduce a health value of each object in the first group to 0; and controlling the first controlled object to perform the first attack operation on the target attack object in the virtual scene in real time, including:
reporting, by the respective computing device, the first attack operation to a server for synchronization of game data of a plurality of clients of the plurality of computing devices using frame synchronization;
automatically combining, by the server, attack operations reported by a plurality of clients of the plurality of computing devices at a fixed frame into an attack operation set,
distributing, by the server, the attack operation set to the plurality of clients of the plurality of computing devices, the attack operation set comprising the first attack operation;
receiving, by the respective computing device, the attack operation set transmitted by the server; and
performing, by the respective computing device, the attack operation set in the virtual scene.

2. The method according to claim 1, wherein the attribute value of the to-be-attacked object comprises the reduced health value of the to-be-attacked object after the first attack operation is performed on the to-be-attacked object, the determining a target attack object from to-be-attacked objects according to attribute values of the to-be-attacked objects comprises:
determining the target attack object from the to-be-attacked objects according to the reduced health value of the to-be-attacked object after the first attack operation is performed on the to-be-attacked object, wherein the target attack object has a largest reduced health value after the first attack operation is performed on the target attack object than other to-be-attacked objects.

3. The method according to claim 1, wherein the attribute value of the to-be-attacked object comprises the reduced health value of the to-be-attacked object after the first attack operation is performed on the to-be-attacked object, the determining a target attack object from to-be-attacked objects according to attribute values of the to-be-attacked objects comprises:
obtaining, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to zero; and
determining the target attack object from the to-be-attacked objects according to their associated first estimated time, wherein the target attack object has the shortest first estimated time than other to-be-attacked objects in the second group after receiving the first attack operation by the first controlled object.

4. The method according to claim 1, wherein the attribute value of the to-be-attacked object comprises the reduced health value of the object in the first group after the second attack operation by the to-be-attacked object is performed on the object in the first group, the determining a target attack object from to-be-attacked objects according to attribute values of the to-be-attacked objects comprises:
  determining the target attack object from the to-be-attacked objects according to the reduced health value of the object in the first group after the second attack operation by the to-be-attacked object is performed on the object in the first group, wherein the object has a largest reduced health value than other objects in the first group after receiving the second attack operation by the to-be-attacked object.

5. The method according to claim 1, wherein the attribute value of the to-be-attacked object comprises the reduced health value of the object in the first group after the second attack operation by the to-be-attacked object is performed on the object in the first group, the determining a target attack object from to-be-attacked objects according to attribute values of the to-be-attacked objects comprises:
  obtaining, according to the reduced health value of the object in the first group after the second attack operation by the to-be-attacked object is performed on the object, a second estimated time of attacking the objects in the first group by the to-be-attacked object, the second estimated time being an average value of time required for the to-be-attacked object to repeatedly perform the second attack operation on each object in the first group to reduce a health value of the object in the first group to 0; and
  determining the target attack object from the to-be-attacked objects according to the second estimated time, wherein target attack object has a shortest second estimated time of attacking the objects in the first group than other to-be-attacked objects in the second group.

6. The method according to claim 1, wherein the attribute value of the to-be-attacked object comprises the reduced health value of the to-be-attacked object after the first attack operation is performed on the to-be-attacked object, and, the reduced health value of the object in the first group after the second attack operation by the to-be-attacked object is performed on the object, the determining a target attack object from to-be-attacked objects according to attribute values of the to-be-attacked objects comprises:
  obtaining, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to 0;
  obtaining, according to the reduced health value of the object in the first group after the second attack operation of the to-be-attacked object is performed on the object, a second estimated time of attacking the objects in the first group by the to-be-attacked object, the second estimated time being an average value of time required for the to-be-attacked object to repeatedly perform the second attack operation on each object in the first group to reduce a health value of each object in the first group to 0; and
  determining the target attack object from the to-be-attacked objects according to the first estimated time and the second estimated time.

7. The method according to claim 6, wherein the determining the target attack object from the to-be-attacked objects according to the first estimated time and the second estimated time comprises:
  determining a weighted value of the to-be-attacked object according to the first estimated time and the second estimated time; and
  determining an attack object with the smallest weighted value from the to-be-attacked objects as the target attack object.

8. The method according to claim 7, wherein the determining a weighted value of the to-be-attacked object according to the first estimated time and the second estimated time comprises:
  obtaining a weight of the to-be-attacked object according to the following formula:

$$C = \begin{cases} -1000 \times \dfrac{1}{(1+A) \times (1+B)} \times \dfrac{3.5}{1+A}, & A < 2.5 \\ -1000 \times \dfrac{1}{(1+A) \times (1+B)}, & A \geq 2.5 \end{cases}$$

wherein C represents the weight of the to-be-attacked object, A represents the first estimated time, and B represents the second estimated time.

9. The method according to claim 1, wherein before the determining a target attack object from to-be-attacked objects according to attribute values of the to-be-attacked objects, the method further comprises:
  obtaining a priority of each to-be-attacked object, the priority being used for indicating a preference order of the to-be-attacked object being the target attack object; and
  determining an attack object with the highest priority among the to-be-attacked objects as the target attack object, and performing the operation of determining a target attack object from to-be-attacked objects according to attribute values of the to-be-attacked objects in a case that there are a plurality of attack objects with the highest priority in the to-be-attacked objects.

10. The method according to claim 9, wherein the target range comprises the attack range and a search range, the search range is located outside the attack range and adjacent to the attack range, and the obtaining a priority of each to-be-attacked object comprises at least one of the following:
  an obtained priority of a to-be-attacked object in the attack range is higher than a priority of a to-be-attacked object in the search range;
  an obtained priority of a second controlled object among the to-be-attacked objects in the attack range is higher than a priority of an object other than the second controlled object among the to-be-attacked objects, the second controlled object being an object controlled by a user in the virtual scene; and
  an obtained priority of the second controlled object among the to-be-attacked objects in the search range is higher than a priority of an object other than the second controlled object in the to-be-attacked objects.

11. The method according to claim 1, wherein the controlling the first controlled object to perform the first attack operation on the target attack object in the virtual scene comprises:

controlling the first controlled object to perform the first attack operation on the target attack object in the virtual scene when the target attack object is inside the attack range; or controlling the first controlled object to move in the virtual scene when the target attack object is outside the attack range but inside the search range, to enable the target attack object to be located inside an attack range of the first controlled object after the movement; and controlling the first controlled object to perform the first attack operation on the target attack object, the target range comprising the attack range and the search range, the search range being located outside the attack range and adjacent to the attack range.

12. A computing device for performing an attack operation in a game, comprising one or more processors and memory storing a plurality of program units, wherein the plurality of program units, when executed by the one or more processors, perform a plurality of operations comprising:

determining, in a virtual scene of a client of the game running on the computing device, a target range corresponding to a first attack operation performed by a first controlled object in the virtual scene, the target range comprising an attack range of the first attack operation, and the first controlled object belonging to a first group in the virtual scene;

identifying to-be-attacked objects in the target range, the to-be-attacked objects belonging to a second group in the virtual scene;

determining a target attack object from the to-be-attacked objects according to attribute values of the to-be-attacked objects, and the attribute value of the to-be-attacked object comprising: a reduced health value of the to-be-attacked object after the first attack operation is performed on the to-be-attacked object, and/or, a reduced health value of an object in the first group after a second attack operation by the to-be-attacked object is performed on the object in the first group, further including:

determining the target attack object from the to-be-attacked objects according to a first estimated time and a second estimated time, wherein the first estimated time is a time required for the first controlled object to repeatedly perform the first attack operation on the to-be-attacked object to reduce a health value of the to-be-attacked object to 0 and the second estimated time being an average value of time required for the to-be-attacked object to repeatedly perform the second attack operation on each object in the first group to reduce a health value of each object in the first group to 0; and controlling the first controlled object to perform the first attack operation on the target attack object in the virtual scene in real time, including:

reporting, by the computing device, the first attack operation to a server for synchronization of game data of a plurality of clients of the plurality of computing devices using frame synchronization;

automatically combining, by the server, attack operations reported by a plurality of clients of the plurality of computing devices at a fixed frame into an attack operation set, distributing, by the server, the attack operation set to the plurality of clients of the plurality of computing devices, the attack operation set comprising the first attack operation;

receiving, by the respective computing device, the attack operation set transmitted by the server; and performing, by the respective computing device, the attack operation set in the virtual scene.

13. The computing device according to claim 12, wherein the attribute value of the to-be-attacked object comprises the reduced health value of the to-be-attacked object after the first attack operation is performed on the to-be-attacked object, the determining a target attack object from to-be-attacked objects according to attribute values of the to-be-attacked objects comprises:

determining the target attack object from the to-be-attacked objects according to the reduced health value of the to-be-attacked object after the first attack operation is performed on the to-be-attacked object, wherein the target attack object has a largest reduced health value after the first attack operation is performed on the target attack object than other to-be-attacked objects.

14. The computing device according to claim 12, wherein the attribute value of the to-be-attacked object comprises the reduced health value of the object in the first group after the second attack operation by the to-be-attacked object is performed on the object in the first group, the determining a target attack object from to-be-attacked objects according to attribute values of the to-be-attacked objects comprises:

determining the target attack object from the to-be-attacked objects according to the reduced health value of the object in the first group after the second attack operation by the to-be-attacked object is performed on the object in the first group, wherein the object has a largest reduced health value than other objects in the first group after receiving the second attack operation by the to-be-attacked object.

15. The computing device according to claim 12, wherein the attribute value of the to-be-attacked object comprises the reduced health value of the to-be-attacked object after the first attack operation is performed on the to-be-attacked object, and, the reduced health value of the object in the first group after the second attack operation by the to-be-attacked object is performed on the object, the determining a target attack object from to-be-attacked objects according to attribute values of the to-be-attacked objects comprises:

obtaining, according to the reduced health value of the to-be-attacked object after the first attack operation is performed on the to-be-attacked object, a first estimated time of attacking the to-be-attacked object by the first controlled object, the first estimated time being a time required for the first controlled object to repeatedly perform the first attack operation on the to-be-attacked object to reduce the health value of the to-be-attacked object to 0;

obtaining, according to the reduced health value of the object in the first group after the second attack operation of the to-be-attacked object is performed on the object, a second estimated time of attacking the objects in the first group by the to-be-attacked object, and the second estimated time being an average value of time required for the to-be-attacked object to repeatedly perform the second attack operation on each object in the first group to reduce a health value of each object in the first group to 0; and determining the target attack object from the to-be-attacked objects according to the first estimated time and the second estimated time.

16. The computing device according to claim 12, wherein before the determining a target attack object from to-beattacked objects according to attribute values of the to-be-attacked objects, the method further comprises:

obtaining a priority of each to-be-attacked object, the priority being used for indicating a preference order of the to-be-attacked object being the target attack object; and determining an attack object with the highest priority among the to-be-attacked objects as the target attack object, and performing the operation of determining a target attack object from to-be-attacked objects according to attribute values of the to-be-attacked objects in a case that there are a plurality of attack objects with the highest priority in the to-be-attacked objects.

17. The computing device according to claim 12, wherein the controlling the first controlled object to perform the first attack operation on the target attack object in the virtual scene comprises:

controlling the first controlled object to perform the first attack operation on the target attack object in the virtual scene when the target attack object is inside the attack range; or controlling the first controlled object to move in the virtual scene when the target attack object is outside the attack range but inside the search range, to enable the target attack object to be located inside an attack range of the first controlled object after the movement; and controlling the first controlled object to perform the first attack operation on the target attack object, the target range comprising the attack range and the search range, the search range being located outside the attack range and adjacent to the attack range.

18. A non-transitory computer readable storage medium storing a plurality of computer programs for performing an attack operation in a game that, when executed by a computing device having one or more processors, cause the computing device to perform a plurality of operations including:

determining, in a virtual scene of a client of the game running on the computing device, a target range corresponding to a first attack operation performed by a first controlled object in the virtual scene, the target range comprising an attack range of the first attack operation, and the first controlled object belonging to a first group in the virtual scene;

identifying to-be-attacked objects in the target range, the to-be-attacked objects belonging to a second group in the virtual scene;

determining a target attack object from the to-be-attacked objects according to attribute values of the to-be-attacked objects, and the attribute value of the to-be-attacked object comprising: a reduced health value of the to-be-attacked object after the first attack operation is performed on the to-be-attacked object, and/or, a reduced health value of an object in the first group after a second attack operation by the to-be-attacked object is performed on the object in the first group, further including:

determining the target attack object from the to-be-attacked objects according to a first estimated time and a second estimated time, wherein the first estimated time is a time required for the first controlled object to repeatedly perform the first attack operation on the to-be-attacked object to reduce a health value of the to-be-attacked object to 0 and the second estimated time being an average value of time required for the to-be-attacked object to repeatedly perform the second attack operation on each object in the first group to reduce a health value of each object in the first group to 0; and controlling the first controlled object to perform the first attack operation on the target attack object in the virtual scene in real time, including:

reporting, by the computing device, the first attack operation to a server for synchronization of game data of a plurality of clients of the plurality of computing devices using frame synchronization;

automatically combining, by the server, attack operations reported by a plurality of clients of the plurality of computing devices at a fixed frame into an attack operation set, distributing, by the server, the attack operation set to the plurality of clients of the plurality of computing devices, the attack operation set comprising the first attack operation;

receiving, by the respective computing device, the attack operation set transmitted by the server; and performing, by the respective computing device, the attack operation set in the virtual scene.

* * * * *